(No Model.)
E. M. KNOLLIN.
MILKING INSTRUMENT.
No. 371,768.  Patented Oct. 18, 1887.
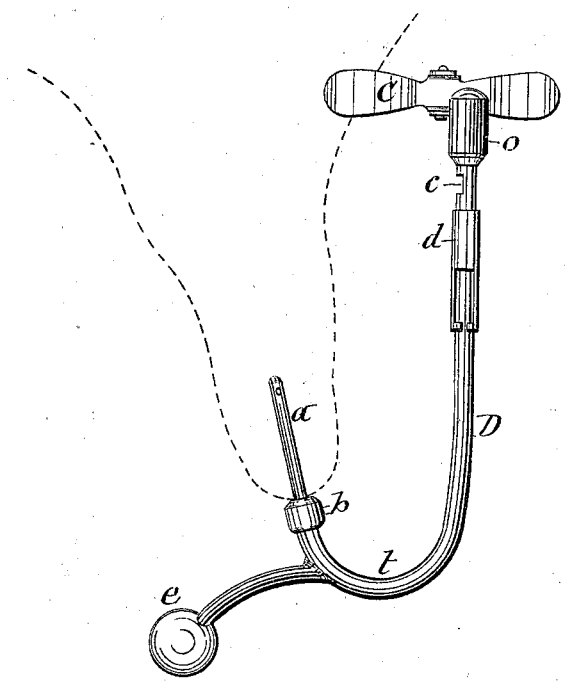
WITNESSES:
A. F. Walz
C. Bendixon
INVENTOR:
Edward M. Knollin
BY
Dull, Laass & Dull
ATTORNEYS.

United States Patent Office.

EDWARD M. KNOLLIN, OF LACONA, NEW YORK.

MILKING-INSTRUMENT.

SPECIFICATION forming part of Letters Patent No. 371,768, dated October 18, 1887.

Application filed January 22, 1887. Serial No. 225,098. (No model.)

*To all whom it may concern:*

Be it known that I, EDWARD M. KNOLLIN, of Lacona, in the county of Oswego, in the State of New York, have invented new and useful Improvements in Milking-Instruments, of which the following, taken in connection with the accompanying drawing, is a full, clear, and exact description.

Various appliances have been resorted to to avoid the manual labor required in milking cows by hand; but in nearly every instance such appliances have failed to come into extensive use, owing to the irritation and injury of the cow's bag, caused either by excessive suction produced by a pump connected with the milk-drawing teat attachment or by the admission of air into the cow's bag. These defects are sought to be overcome by my present invention; and to that end it consists, chiefly, of a milking-instrument comprising a milk-drawing tube adapted to be inserted into the teat and a pipe extended from the base of the teat-tube and rising at the exterior of the teat, and having its overflow or discharge opening higher than the inner end of the teat-tube, thereby causing some of the milk to remain in the cow's bag immediately above the teat-tube, and thus obviating the danger of admitting air into the cow's bag either while milking or in the act of withdrawing the teat-tube, and in other details, as hereinafter more fully described, and specifically set forth in the claims.

In the annexed drawing the figure is a side view showing my invention in its operative position.

Similar letters of reference indicate corresponding parts.

$a$ represents a small tube adapted to be inserted into the teat of the cow, as indicated by dotted lines in the annexed drawing. Said tube is to be formed of silver or other suitable material, which will obviate irritation or poisoning of the teat. The end which enters the teat is perforated to allow the milk to enter the tube. The base or outer end of the tube is provided with a circumferential boss or projection, $b$, which presses against the end of the teat and serves as a stop to prevent the tube from entering the teat too far.

From the base of the tube $a$ is extended a pipe or duct, D, which rises at the exterior of the teat and has its overflow or discharge opening $c$ somewhat higher than the inner end of the teat-tube, so that a small quantity of milk always remains over the inner end of the teat-tube, for the purpose hereinbefore stated. The pipe D is preferably detachably connected to the teat-tube $a$ by the end of said pipe screwing into a screw-threaded socket in the boss $b$, and the cap $o$ is also detachably connected to the opposite end of the pipe D. This arrangement allows the said parts to be readily disconnected from each other when desired for cleaning the teat-tube and aforesaid pipe. The upper end of the pipe D has the discharge opening or port $c$ in its side, and on the exterior of the pipe slides a cut-off valve, $d$, of the form of a sleeve, which is adapted to be pushed up over the port, so as to close the same.

C represents a clasp, which is attached to the cap $o$ on the upper end of the pipe D, and is adapted to grip the side of the bag or teat sufficiently to support the pipe D in an upright position. To the lower portion of the aforesaid pipe I connect a weight, $e$, which projects from the side opposite to that at which the upward-projecting portion of the pipe is carried, said weight serving to counterbalance the latter portion of the pipe and hold the same in its upright position in case the clasp C is disconnected from the bag or teat. The aforesaid upright position of the pipe D is essential to maintain the discharge-port $c$ at a proper elevation above the end of the teat, so as to form between said port and teat-tube $a$ a milk-trap, $t$, which effectually prevents the passage of air through the pipe D and tube $a$ into the cow's bag, and thus obviates the irritation of the latter. I prefer, however, to extend the pipe D to such an elevation as to bring the port $c$ either on a level with or slightly above the inner end of the teat-tube. Inasmuch as in this instrument the milk is allowed to flow by gravity from the cow's bag through the instrument, the aforesaid location of the port $c$ in relation to the teat-tube $a$ causes a small quantity of milk to remain in the teat directly over the end of the tube $a$, and the interior of the teat becomes thus sealed against the ingress of air to the teat during the withdrawal of the tube $a$ from the teat. Said milk may be subsequently stripped out by hand.

In applying the aforesaid instrument to the cow the sleeve or cut-off valve $d$ is to be first pushed over the port $c$, so as to close the same, then the tube $a$ is to be inserted into the teat and the boss $b$ brought to bear on the end of the teat, and then the clasp C is to be applied to the bag to sustain the pipe D in its upright position. So soon as the pipe D has become charged with milk the valve $d$ is to be moved to open the port $c$. The milk then issues through said port and falls into the milk-pail, which may be suspended under the cow's bag by a strap applied across the cow's back, and having its ends hanging on opposite sides of the cow and provided with hooks or clasps by which to connect the strap to the milk-pail.

Having described my invention, what I claim as new, and desire to secure by Letters Patent, is—

1. A milking instrument composed of a teat-tube, a pipe extended from the base of said tube, and when in use rising at the exterior of the teat, and having its discharge-opening at an elevation above the inner end of the teat-tube, a valve connected with said external pipe for opening and closing the discharge-opening thereof, and a clasp attached to said tube, substantially as and for the purpose specified.

2. In a milking instrument, the combination of a tube adapted to be inserted into the teat, a pipe extending from said tube, and when in use rising at the exterior of the teat to an elevation above the end of the teat, a port in the side of the said pipe, and a sleeve sliding on the pipe and adapted to close the port thereof, as set forth.

3. In a milking-instrument, the combination of a tube adapted to be inserted into the teat, a pipe extended from said tube, and when in use rising at the exterior of the teat to an elevation above the end of the teat, and a counterpoise connected to the said pipe to sustain the same in an erect position, as set forth.

4. A milking-instrument composed of a tube adapted to be inserted into the teat, a duct extended from said tube, and when in use rising at the exterior of the teat to an elevation above the end of the teat, a port in the side of the upper end of the duct, a sleeve sliding on the duct and adapted to close the port thereof, a clasp on the said duct, and a counterpoise on the base of the duct, all combined to operate substantially as described and shown.

In testimony whereof I have hereunto signed my name and affixed my seal, in the presence of two attesting witnesses, at Sandy Creek, in the county of Oswego, in the State of New York, this 12th day of January, 1887.

EDWARD M. KNOLLIN. [L. S.]

Witnesses:
WM. R. HOWLETT,
M. L. MAY.